(12) United States Patent
Ho et al.

(10) Patent No.: US 11,166,466 B2
(45) Date of Patent: Nov. 9, 2021

(54) BIOLOGICAL FUNGICIDE COMPOSED BY PLANT EXTRACTS

(71) Applicant: JH Biotech Inc.

(72) Inventors: Wang Ching Ho, Mountain View, CA (US); Ching Ting Feng, Chiayi (TW); Hsinhung John Hsu, Camarillo, CA (US)

(73) Assignee: JH Biotech Inc., Ventura, CA (US)

( * ) Notice: Subject to any disclaimer, the term of this patent is extended or adjusted under 35 U.S.C. 154(b) by 0 days.

(21) Appl. No.: 16/844,151

(22) Filed: Apr. 9, 2020

(65) Prior Publication Data

US 2020/0323219 A1    Oct. 15, 2020

Related U.S. Application Data

(60) Provisional application No. 62/832,619, filed on Apr. 11, 2019.

(51) Int. Cl.
*A01N 65/08* (2009.01)
*A01N 25/30* (2006.01)
*A01N 65/40* (2009.01)

(52) U.S. Cl.
CPC .............. *A01N 65/08* (2013.01); *A01N 25/30* (2013.01); *A01N 65/40* (2013.01)

(58) Field of Classification Search
CPC ................................. A01N 65/08; A01N 25/30
See application file for complete search history.

(56) References Cited

U.S. PATENT DOCUMENTS 6,231,865 B1 * 5/2001 Hsu .................... A01N 65/22
424/739

FOREIGN PATENT DOCUMENTS

| CN | 101107934 B | * | 7/2010 |
| CN | 103 263 450 A | | 8/2013 |
| CN | 104041538 B | * | 11/2015 |
| KR | 2012 0104803 A | | 9/2012 |
| KR | 2015 0010265 A | | 1/2015 |

OTHER PUBLICATIONS

Cho et al. Korean Society for Biotechnology and Bioengineering Journal 29(1): 29-35, 2014, original and machine translated (Year: 2014).*

Ho, Wang-Ching, et al. Canadian journal of plant pathology 28, 4 (2006): 519-525. (Year: 2006).*
Ahn, A.-J et al., Growth inhibitory effects of Galla Rhois-derived tannins on intestinal bacteria, Journal of Applied Microbiology, vol. 84, Issue 3, Jul. 9, 2002, DOI: 10.1046/j.1365-2672.1998.00363.x.
Vivek K. Bajpai, Atiqur Rahman, Shruti Shukla, Savita Shukla, S.M. Yassir Arafat, M. Amzad Hossain & Archana Mehta (2010) In vitro kinetics and antifungal activity of various extracts of Terminalia chebula seeds against plant pathogenic fungi, Archives of Phytopathology and Plant Protection, 43:8, 801-809, DOI: 10.1080/03235400802246887.
Choi, Jang-Gi et al., In Vitro Activity of Methyl Gallate Isolated from Galla Rhois Alone and in Combination with Ciprofloxacin Against Clinical Isolates of *Salmonella*, J. Microbiol. Biotechnol. (2008), DOI: 10.4014/jmb.0800.025.
Ahn, Y. J., Lee, H. S., Oh, H. S., Kim, H. T., Lee, Y. H. 2005. Antifungal activity and mode of action of galla rhois-derived phenolics against phytopathogenic fungi. Pesticide Biochemistry and Physiology 81: 105-112, https://doi.org/10.1016/j.pestbp.2004.10.003.
Feng, C.T. et al., Inhibitory Effects of Chinese Medicinal Herbs on Plant-Pathogenic Bacteria and Identification of the Active Components from Gallnuts of Chinese Sumac, The American Phytopathological Society, Plant Disease, Aug. 2012, Plant Dis. 96:1193-1197, DOI: 10.1094/ PDIS-08-11-0673-RE.
Ho, Wang-Ching et al., Effect of extracts of Chinese medicinal herbs on spore germination of Alternania brassicicola, and nature of an inhibitory substance from gallnuts of Chinese sumac (*Rhus chinensis*), Can. J. Plant Pathol. 28: (2006), pp. 519-525.
Kang, M.S., Inhibitory effect of methyl gallate and gallic acid on oral bacteria, J Microbiol. Dec. 2008;46(6):744-50, DOI: 10.1007/s12275-008-0235-7.
Vu, T. T. et al., Antibacterial activity of tannins isolated from Sapium baccatum extract and use for control of tomato bacteria wilt. Plos One 2017, https://doi.org/10.1371/journal.pone.0181499.
Lin, Mei-Hui et al., Inhibitory Effects of 1,2,3,4,6-Penta-O-Galloyl—D-Glucopyranose on Biofilm Formation by *Staphylococcus aureus*, Antimicrobial Agents and Chemotherapy, Mar. 2011, p. 1021-1027, doi:10.1128/AAC.00843-10.
Vivek K. Bajpai et al: "In vitro kinetics and antifungal activity of various extracts of Terminalia chebula seeds against plant pathogenic fungi", Archiv Fuer Phytopathologie Und Pflanzenschutz, vol. 43, No. 8, May 20, 2010 (May 20, 2010), pp. 801-809.

* cited by examiner

*Primary Examiner* — Abigail Vanhorn
*Assistant Examiner* — Janice Y Silverman
(74) *Attorney, Agent, or Firm* — Ralph D. Chabot

(57) ABSTRACT

The invention describes a natural fungicide which comprises gallnut and myrobalan extracts which exhibit a synergistic effect against *Alternaria brassicicola*, and can be used to control crop fungal diseases.

4 Claims, No Drawings

BIOLOGICAL FUNGICIDE COMPOSED BY PLANT EXTRACTS

FIELD OF THE INVENTION

The invention relates to a plant extract compound formula having a strong anti-fungal effect, which can be used as a fungicide to control crop fungal diseases.

BACKGROUND OF THE INVENTION

Crop cultivation often suffers from the damage caused by different phytopathogenic fungi and bacteria, resulting in the reduction of the quality of agricultural products or the loss of yield. Farmers mainly rely on chemical agents to control crop diseases caused by phytopathogens, but chemical agents can cause: (1) harm to the health of farm workers as well as those consumers that ingest agricultural products; (2) phytotoxicity of crops; (3) resistance to phytopathogenic fungi and bacteria; (4) harm to non-target organisms; and, (5) environmental pollution.

Agricultural research is focusing on the development of natural biopesticides that: a) reduce environmental pollution; b) does not negatively affect non-target organisms; c) is not toxic to humans; and, d) reduces the risk of enhancing phytopathogens' resistance. Development of such natural microbicides would be positive for the earth's ecological environment and be a critical component for sustainable green agriculture.

Galla Chinensis, commonly referred to as "Chinese gallnut", is a gall produced on the *Rhus chinensis* plant stimulated by aphids, also known as the Chinese sumac or nutgall tree. Gallnuts can be classified into two types—Du-ensiform gallnut and horned gallnut. Du-ensiform gallnut is long, rounded or dusiform sac; and horned gallnut is diamond-shaped, with irregular angular branches, obvious pubescence, and thin walls. Two types of gallnuts both are 2.5 to 9 cm long and 1.5 to 4 cm in diameter. Surface is taupe or gray-brown. Fresh gallnut can be dried or fried until slightly yellow. It is hard, brittle, easily broken, and having a horn-like shiny section. Its wall is from 0.2 to 0.3 cm thick, smooth and with dark brown dead aphid and gray powdery dead aphid excrement. The odor is quite peculiar and taste is astringent. When ground into powder form or dry extract, the substance exhibits anti-inflammatory and antibacterial properties.

The main chemical constituents of gallnut are 56 to 80% gallotannins, 2 to 7% gallic acid (3,4,5-trihydroxybenzoic acid), resins, fats, waxes, starch, and other ingredients. Gallic acid and methyl gallate are separated from the extract of Galla Chinensis (Feng et al., 2012, Plant Dis. 96: 1193-1197). Gallic acid can effectively inhibit the conidial germination of phytogenic pathogen of *Alternaria brassicicola*. Methyl gallate can kill or inhibit the pathogens as *Acidovorax citrulli, Ralstonia solanacearum*, and *Xanthomonas euvesicatoria* (Feng et al., 2012, Plant Dis. 96: 1193-1197; Ho et al., 2006, Can. J. Plant Pathol. 28: 519-525). 1000 ppm of gallic acid or methyl gallate can stop the conidial germination of rice blast pathogen *Magnaporthe grisea* (teleomorph: *Pyricularia oryzae*), and stop the intrusive behavior of the germinated conidia (Ahn et al., 2005, Pesticide Biochemistry and Physiology 81: 105-112).

Myrobalan is a plum-like mature fruit of *Terminalia chebula* from the Genus *Terminalia* of Family Combretaceae. Myrobalan is known to inhibit various bacteria. A number of glycosides have been isolated from myrobalan, including the triterpenes arjunglucosid I, arjungenin, and the chebulosides I and II. Other constituents include a coumarin conjugated with gallic acids called chebulin, as well as other phenolic compounds including ellagic acid, 4, 2, 4-chebulyl-β-D-glucopyranose, chebulinic acid, gallic acid, ethyl gallate, punicalagin, 1, 2, 3, 4, 6-penta-O-β-galloyl-D-glucose, terflavin A, terchebin, luteolin, and tannic acid. Luteic acid can be isolated from the bark. *Terminalia chebula* also contains terflavin B, a type of tannin, while chebulinic acid is found in the fruits. Myrobalan aqua-extract can effectively inhibit Gram-negative bacteria like *Acidovorax citrulli, Burkholderia cepacia, Ralstonia solanacearum, Xanthomonas euvesicatoria*, and *X. citri* pv. *citri* (Feng et al., 2012, Plant Dis. 96: 1193-1197), and the active compounds of myrobalan which as 1000 μg/mL extract by methanol and chloroform, and 500 μg/mL extract by ethyl acetate can inhibit conidia germination of plant fungal pathogens such as *Fusarium solani, Colletotrichum capsici* and *Phytophthora capsici* and mycelium growth of *Botrytis cinerea* and *Fusarium oxysporum* (Bajpai et al., 2010, Archives of Phytopathology and Plant Protection 43: 801-809).

The active compounds including gallic acid and methyl gallate which can be isolated from gallnut or chebulagic acid and chebulinic acid which can be isolated from myrobalan, also can be isolated from the fruit of *Spaium baccatum*. And these compounds can inhibit phytopathogenic bacteria such as *Acidovorax avenae* subsp. *cattleyae, Burkholderia glumae, Pseudomonas syringae* pv. *actinidiae, Ralstonia solanacearum* and *Xanthomonas arboricola* pv. *pruni* (Vu et al., 2017, Plos OneL, https://doi.org/10.1371/journal.pone.0181499).

SUMMARY OF THE INVENTION

A natural fungicide is described which can be used as an effective treatment to control or inhibit crop fungal diseases, namely those diseases associated with the plant pathogenic fungi *Alternaria brassicicola* or other plant diseases caused by phyto-pathogenic fungi including, but not limited to *Bipolaris* spp., *Curvularia* spp., *Exorahilum* spp., *Fusarium* spp., and *Phytophthora* spp.

The natural fungicide comprises the active ingredients found in: a) Galla Chinensis (gallnut) and, b) the fruit produced from *Terminalia chebula* (myrobalan).

The combination of the active ingredients found in gallnut and myrobalan has a synergistic effect which significantly increases the anti-fungal effectiveness than if either were used separately.

As used herein, the term "gallnut" refers to Galla Chinensis. The term "myrobalan" refers to dried fruit of *Terminalia chebula*.

To manufacture the natural fungicide, water extracts of gallnut and myrobalan are obtained by first providing both in a ground powder form by cutting the gall or plant tissue into small pieces, pulverizing, grinding or otherwise increasing the surface area of the pieces to facilitate extraction. Hydrophilic solvents such as water can be used for extraction. Because it is safe, easy to use, and economic, water is a preferred solvent for extraction. Extraction can be performed at a wide range of temperatures and time sufficient to migrate the active ingredients into solution. A preferred temperature range is from 60 to 100° C., from about 30 to 60 minutes followed by filtration of the dross. Additionally, extraction can occur under pressure at temperatures exceeding 100° C. for a shorter period of time.

A surfactant such as yucca extract or sodium lauryl sulfate (SLS) can optionally be added as one of the ingredient of the natural fungicide.

The term "gallnut extract" means the extracted portion of gallnut which remains as part of the filtrate following filtration. The term "myrobalan extract" means the extracted portion of myrobalan which remains as part of the filtrate following filtration. Both gallnut extract and myrobalan extract comprise their respective active ingredients.

The active ingredients which make up the natural fungicide comprise a ratio of between 15%-80% gallnut to 85%-20% myrobalan.

Dilution ratios can be based on the initial weight of gallnut and myrobalan used and the volume of the concentrated natural fungicide.

One method for effective control of fungal leaf spot disease caused by *Alternaria brassicicola* comprises the steps of: identifying a plant in need thereof, and administering to the plant active ingredients consisting essentially of: (A) Gallnut extract; and, (B) Myrobalan extract; wherein the weight ratio of Gallnut extract to Myrobalan extract is between about 3-1 to 1-4, with a range of 3:2 to 3:4 being preferred and where the combination of (A) and (B) is a more effective fungicide than if an equivalent amount of either (A) or (B) were used alone. Surfactant can be optionally added to this formulation.

The features and advantages of the present invention are described in detail in the following paragraphs. The content is for illustrative purposes and is not intended to limit the scope of the invention and the types of crop diseases that can be controlled.

DETAILED DESCRIPTION OF THE PREFERRED EMBODIMENT

The method used to create formulations according to the invention will be discussed followed by the treatment results.

The active ingredients of both gallnut and myrobalan are extracted from their respective powder form. The preferred method is to mix pre-determined amounts of gallnut and myrobalan in a pre-determined amount of solvent and heat for a pre-determined period of time to release the active ingredients into solution, and then remove the dross by filtration.

In a most preferred embodiment, the filtrate is heated to evaporate additional liquid to form a concentrated natural fungicide into which surfactant can be optionally added. Examples of surfactant include yucca extract in a range of between 0% and 15% by volume or SLS in a range of between 0% and 10% by weight.

In order to approximate the amount of active ingredients of gallnut and myrobalan present in the filtrate, testing was performed.

200 grams horned gallnut (i.e. powder form) was combined with 1000 ml water and heated for 60 minutes at 100° C. Thereafter, the solution was filtered. The dross was dried and weighed 159.4 grams from which gallnut extract is determined to weigh 40.6 grams. The ratio of overall weight of gallnut to the weight of gallnut extract is 4.93:1 (200÷40.6).

200 grams myrobalan (i.e. powder form) was combined with 1000 ml water and heated for 60 minutes at 100° C. Thereafter, the solution was filtered. The dross was dried and weighed 173.2 grams from which myrobalan extract is determined to weigh 26.8 grams. The ratio of overall weight of myrobalan to the weight of myrobalan extract is 7.46:1 (200÷26.8).

Numerous solvents, besides water could be used for extraction including: a) 50% to 75% alcohol; b) 60% to 75% acetone; or, c) 50% alcohol and 50% acetic acid whereby the extraction process would preferably be performed at ambient conditions.

The following describes the procedure for making the formulation described below in Row 6 of Table 1-1 for 20% (vol) Gallnut and 30% (vol) Myrobalan.

a. add 400 grams gallnut powder and 600 grams myrobalan powder to 5000 ml water (i.e. 1000 grams powder to 5000 ml solvent) to form a solution.

b. heat the solution for between 30-60 minutes at 100° C. and add water as necessary to maintain a constant solution volume (i.e. 5000 ml).

c. thereafter, filter the solution thru a 44 μm mesh to remove undissolved solids dross from the filtrate.

d. heat filtrate to reduce volume to a pre-determined volume (i.e. 1000 ml) thus forming a concentrated solution.

50 ml of the concentrated solution is combined with 50 ml water to become the concentrated natural fungicide described in Row 6 of Table 1-1. As shown in Table 1-1, the formulation can be diluted up to 1000 times and used as an effective use-dilution fungicide to control crop fungal disease caused by *Alternaria brassicicola*.

Alternatively, the heating procedure described in step b above could also occur under pressure. As an example, the solution could be heated for a shorter period of time, 121° C. for 15-45 minutes under 15 PSIG.

The following are examples of the synergistic effect of the formulation when diluted and used for anti-fungal purposes:

Inhibitory Effect of Plant Extract Formulation on Conidial Germination of *Alternaria brassicicola*

Varied formulations were made and tested. Neither gallnut or myrobalan possess inhibitory effects when used individually in the specified concentrations. However, when a formulation comprises gallnut and myrobalan in the concentrations specified, the formulation has a synergistic effect with regard to treatment of the plant fungal pathogen *Alternaria brassicicola*.

Tables 1-1 and 1-2 show the conidial germination rates of *Alternaria brassicicola*. The tables differ only in how the gallnut and myrobalan are presented. For Table 1-1, gallnut and myrobalan are presented in vol % as described earlier for the Row 6 procedure while Table 1-2 presents the active ingredients of gallnut and myrobalan as concentration (grams/ml).

One drop of 20 μl of pathogen conidia suspension (100 conidia per microliter) was mixed with one drop of 20 μl for each of the eight combinations of gallnut and myrobalan formulations, and at dilutions of 750 times, 1000 times, and 1500 times. Each combination was placed on test slides that were maintained at 100% relative humidity at room temperature. The germination rate of 100 conidia on each slide was calculated visually using a microscope following an incubation period of 24 hours.

The conidial germination rates of *Alternaria brassicicola* in water alone were between 96-98%. The germination of *Alternaria brassicicola* conidia decreased from 98% to 42% when 20% gallnut was diluted with 750 times water but only decreased to 94% when 15% gallnut was diluted with 750 times water. The germinations of *Alternaria brassicicola* conidia was only reduced from 98% to 95% when 30% myrobalan was diluted with 750 times water while there was no change when 20% myrobalan was diluted with 750 times water.

It can be concluded that when 20% gallnut was diluted with 750 times water, it caused a partially inhibitory effect on *Alternaria brassicicola* conidial germination. However, 30% or 20% myrobalan diluted with 750 times water showed no inhibition on conidial germination of *Alternaria brassicicola*.

In contrast to single applications of either gallnut or myrobalan, a synergistic effect was observed when gallnut and myrobalan were combined at various ratios between 15-20% by volume gallnut to 20-30% by volume myrobalan. The germination rates were completely suppressed at 750 times and 1000 times dilution and a noticeable rate reduction was observed even at 1500 times dilution.

The most effective combinations observed were: (1) concentrated gallnut extract in 20% and concentrated myrobalan extract in 30%; (2) concentrated gallnut extract in 20% and concentrated myrobalan extract in 20%; and, (3) concentrated gallnut extract in 15%, and concentrated myrobalan extract in 30%. The conidial germination of *Alternaria brassicicola* could not be completely inhibited when the three formulations were diluted to 1500 times.

Based on the test results described above and in the following tables, a natural fungicide as described herein can be applied to an agriculture crop at a rate from about 2.0-8.5 oz./20-100 gal. of water per acre and wherein the fungicide composition comprises:

(A) the active ingredients from about 15 wt. % to 80 wt. % gallnut; and, (B) the active ingredients from about 85 wt. % to 20 wt. % myrobalan;

the combination of (A) and (B) is a more effective fungicide than if an equivalent amount of either (A) or (B) are used alone.

TABLE 1-1

Inhibition effect of single plant extracts and their combinations under dilution to 750, 1000 and 1500 times on *Alternaria brassicicola* conidial germination*

| Vol %** | | | Conidial germination rate (%) in different diluted condition | | |
|---|---|---|---|---|---|
| Gallnut | Myrobalan | Water | 750× | 1000× | 1500× |
| 0 | 0 | 100 | 98 | 96 | 96 |
| 20 | 0 | 80 | 42 | 97 | 94 |
| 15 | 0 | 85 | 94 | 98 | 97 |
| 0 | 30 | 70 | 95 | 96 | 97 |
| 0 | 20 | 80 | 98 | 96 | 95 |
| 20 | 30 | 50 | 0 | 0 | 71 |
| 20 | 20 | 60 | 0 | 0 | 77 |
| 15 | 30 | 55 | 0 | 0 | 59 |

*The conidial germinations of *Alternaria brassicicola* were tested on slides in a moist chamber. Four replicates for each treatment, and germination rate were calculated in each germination rate. The conidial germination rates were observed in 24th hours after the treatment.
**An equal weight (in grams) of gallnut and myrobalan powder to an equal volume (in ml) were used.

TABLE 1-2

Inhibition effect of single plant extracts and their combinations under dilution to 750, 1000 and 1500 times on *Alternaria brassicicola* conidial germination*

| Single plant extract and ratio of combination** | | | Conidial germination rate (%) in different diluted condition | | |
|---|---|---|---|---|---|
| Gallnut Extract (gms) | Myrobalan Extract (gms) | Formulation volume (ml) | 750× | 1000× | 1500× |
| 0 | 0 | 100 | 98 | 96 | 96 |
| 4.06 | 0 | 100 | 42 | 97 | 94 |
| 3.04 | 0 | 100 | 94 | 98 | 97 |
| 0 | 4.02 | 100 | 95 | 96 | 97 |
| 0 | 2.68 | 100 | 98 | 96 | 95 |
| 4.06 | 4.02 | 100 | 0 | 0 | 71 |
| 4.06 | 2.68 | 100 | 0 | 0 | 77 |
| 3.04 | 4.02 | 100 | 0 | 0 | 59 |

*The conidial germinations of *Alternaria brassicicola* were tested on slides in a moist chamber. Four replicates for each treatment, and germination rate were calculated in each germination rate. The conidial germination rates were observed in 24th hours after the treatment.
**Dry weights were calculated as follows: 1 gram gallnut extract requires 4.93 grams gallnut; 1 gram myrobalan extract requires 7.46 grams myrobalan.

Inhibitory Effect of Plant Extract Compound Formulation with Surfactants on Conidial Germination of *Alternaria brassicicola*

Tables 2-1 and 2-2 show the same plant extract formulations as in Table 1 but including the addition of a surfactant; specifically, either yucca plant extract (*Yucca schidigera*) or sodium lauryl sulfate (SLS). Each was added for testing conidial germinations of *Alternaria brassicicola*. The formulations were diluted to a higher degree than as presented in Tables 1-1 and 1-2. Dilutions were at 1000 times, 1500 times and 2000 times water.

10 vol % of yucca extract or 5 wt. % of SLS was added to the formulations and then used to test the inhibitory effects on conidial germination on the same fungal pathogen *Alternaria brassicicola*.

The results indicated that the addition of 10 vol % of yucca extract provided complete conidial germination inhibition to all combinations of gallnut and myrobalan extracts up to 1000 times water. However, yucca extract at 1500 times or higher was not as effective as when not used.

The results indicated that the addition of 5 wt. % SLS provided complete conidial germination inhibition to all combinations of gallnut and myrobalan extracts up to 1500 times water. The results showed when added the SLS in the formulas, the complete inhibition of conidial germination of *Alternaria brassicicola* can be improving from 1000 to 1500 times.

TABLE 2-1

Inhibition effect of plant extracts combinations adding with natural surfactant or chemical surfactant on conidial germination of *Alternaria brassicicola**

| Percentage of each ingredients %** | | | | | Conidial germination rate (%) in different diluted condition | | |
|---|---|---|---|---|---|---|---|
| Gallnut | Myrobalan*** | *Yucca* Extract | SLS | Water | 1000× | 1500× | 2000× |
| 0 | 0 | 0 | 0 | 100 | 95 | 96 | 94 |
| 20 | 30 | 10 | 0 | 40 | 0 | 95 | 94 |
| 20 | 20 | 10 | 0 | 50 | 0 | 94 | 95 |
| 15 | 30 | 10 | 0 | 45 | 0 | 98 | 97 |
| 0 | 0 | 10 | 0 | 90 | 53 | 94 | 95 |
| 20 | 30 | 0 | 5 | 45 | 0 | 0 | 91 |
| 20 | 20 | 0 | 5 | 55 | 0 | 0 | 92 |
| 15 | 30 | 0 | 5 | 50 | 0 | 0 | 88 |
| 0 | 0 | 0 | 5 | 95 | 55 | 90 | 94 |

*The conidial germinations of *Alternaria brassicicola* were tested on slides in a moist chamber. Four replicates for each treatment, and germination rate were calculated in each germination rate. The conidial germination rates were observed in 24 hours after the treatment.
**Except SLS is measured by weight % (grams), the other ingredients are measured by volume % (ml).
***An equal weight (in grams) of gallnut and myrobalan powder to an equal volume (in ml) were used.

TABLE 2-2

Inhibition effect of plant extracts combinations adding with natural surfactant or chemical surfactant on conidial germination of *Alternaria brassicicola**

| Ratio of plant extracts with surfactants combination | | | | | Conidial germination rate (%) in different diluted condition | | |
|---|---|---|---|---|---|---|---|
| Gallnut Extract (gms) | Myrobalan Extract (gms)** | *Yucca* Extract (ml) | SLS (gms) | Formulation volume (ml) | 1000× | 1500× | 2000× |
| 0 | 0 | 0 | 0 | 100 | 95 | 96 | 94 |
| 4.06 | 4.02 | 10 | 0 | 100 | 0 | 95 | 94 |
| 4.06 | 2.68 | 10 | 0 | 100 | 0 | 94 | 95 |
| 3.04 | 4.02 | 10 | 0 | 100 | 0 | 98 | 97 |
| 0 | 0 | 10 | 0 | 100 | 53 | 94 | 95 |
| 4.06 | 4.02 | 0 | 5 | 100 | 0 | 0 | 91 |
| 4.06 | 2.68 | 0 | 5 | 100 | 0 | 0 | 92 |
| 3.04 | 4.02 | 0 | 5 | 100 | 0 | 0 | 88 |
| 0 | 0 | 0 | 5 | 100 | 55 | 90 | 94 |

*The conidial germinations of *Alternaria brassicicola* were tested on slides in a moist chamber. Four replicates for each treatment, and germination rate were calculated in each germination rate. The conidial germination rates were observed in $24^{th}$ hours after the treatment.
**Dry weights were calculated as follows: 1 gm gallnut extract requires 4.93 grams gallnut; 1 gram myrobalan extract requires 7.46 grams myrobalan.

From the results of the foregoing tables, a combination of gallnut extract and myrobalan extract has a synergistic effect on the ability to inhibit crop fungal diseases caused by phyto-pathogenic fungi, namely *Alternaria brassicicola* than if gallnut extract or myrobalan extract were used separately.

As used herein, the term "about", when referring to a value or to an amount of mass, weight, time, volume, concentration, or percentage can encompass variations of, in some embodiments ±20%, in some embodiments ±10%, in some embodiments ±5%, from the specified amount, as such variations are appropriate in the disclosed application.

It is understood that, in light of a reading of the foregoing description, those with ordinary skill in the art will be able to make changes and modifications to the present invention without departing from the spirit or scope of the invention, as defined herein. For example, those skilled in the art may substitute materials supplied by different manufacturers than specified herein without altering the scope of the present invention.

We claim:

1. A method for applying a fungicide to an agriculture crop comprising applying a fungicide effective amount of:

(A) 20-60 wt % Gallnut extract; and, (B) 80-40 wt % Myrobalan extract;

the combination of (A) and (B) is a more effective fungicide than if either (A) or (B) are used alone.

2. The method of claim 1 where the fungicide composition further includes a surfactant.

3. The method of claim 2 wherein the surfactant is selected from the group consisting of: sodium lauryl sulfate and *yucca* extract.

4. A fungicide consisting essentially of:

between about 20-60 wt % aqueous Gallnut extract;

between about 80-40 wt % aqueous Myrobalan extract; and, about 5 wt % sodium lauryl sulfate.

* * * * *